United States Patent

Dreibholz et al.

[11] Patent Number: 5,911,648
[45] Date of Patent: Jun. 15, 1999

[54] AUTOMATIC TRANSMISSION CONTROL METHOD INCLUDING SHIFTING ABERRATION REGULATING PHASE

[75] Inventors: Ralf Dreibholz, Meckenbeuren; Gerd Frotscher; Thomas Schober, both of Friedrichshafen; Martin Vohmann, Eriskirch, all of Germany

[73] Assignee: ZF Friedrichshafen AG, Friedrichshafen, Germany

[21] Appl. No.: 08/817,559

[22] PCT Filed: Nov. 25, 1995

[86] PCT No.: PCT/EP95/04647

§ 371 Date: Apr. 18, 1997

§ 102(e) Date: Apr. 18, 1997

[87] PCT Pub. No.: WO96/17189

PCT Pub. Date: Jun. 6, 1996

[30] Foreign Application Priority Data

Dec. 2, 1994 [DE] Germany ............... 44 42 991

[51] Int. Cl.⁶ .................................................. F16H 61/06
[52] U.S. Cl. .......................... 477/154; 477/148; 477/149
[58] Field of Search ...................... 477/143, 144, 477/148, 149, 154, 156, 159, 160, 110

[56] References Cited

U.S. PATENT DOCUMENTS

| | | | |
|---|---|---|---|
| 4,653,351 | 3/1987 | Downs et al. | 477/149 X |
| 4,793,216 | 12/1988 | Hiramatsu et al. | 477/149 X |
| 5,113,343 | 5/1992 | Hunter et al. | 477/149 X |
| 5,401,219 | 3/1995 | Kimura et al. | 477/149 X |
| 5,443,427 | 8/1995 | Ataka et al. | 477/154 X |
| 5,704,874 | 1/1998 | Shimada et al. | 477/154 |
| 5,722,913 | 3/1998 | Gierer | 477/149 X |

FOREIGN PATENT DOCUMENTS

| | | |
|---|---|---|
| 0435373A2 | 7/1991 | European Pat. Off. . |
| 0435374B1 | 7/1991 | European Pat. Off. . |
| 0475585A1 | 3/1992 | European Pat. Off. . |
| 4240621A1 | 6/1994 | Germany . |
| 4424456a1 | 1/1996 | Germany . |

*Primary Examiner*—Charles A. Marmor
*Assistant Examiner*—Scott Lund
*Attorney, Agent, or Firm*—Davis and Bujold

[57] ABSTRACT

A method of controlling and regulating an automatic transmission with overlapping gearshifts. The change from the control mode to the regulating mode for the disengaging clutch (11) is made here when a defective engagement of the engaging clutch (12) is detected.

7 Claims, 2 Drawing Sheets

AUTOMATIC TRANSMISSION CONTROL METHOD INCLUDING SHIFTING ABERRATION REGULATING PHASE

The invention concerns a process for controlling and regulating an automatic transmission.

BACKGROUND OF THE INVENTION

EP-OS 0435 374 has disclosed a process for controlling an automatic transmission where the gearshift from a first to a second reduction ratio is effected by a first clutch disengaging and a second clutch engaging. With the beginning of the gearshift, the pressure of the first clutch is lowered whereby the clutch is not allowed to slip. The curve of a turbine speed establishes the disengagement point of the first clutch. After the disengagement point is established, the slip of the second clutch is controlled in accordance with a time function.

A process for automatic control of an automatic transmission has also been described in the not pre-published German patent application P 44 24 456.8 of Jul. 12, 1994. The process consists of the following steps for an upshift: rapid-filling phase, filling-equalizing phase, load take-up phase, gradient-setting phase, sliding phase, gradient-breakdown phase and closing phase. A disadvantage of the aforementioned process is that a defective filling of the clutch to be engaged due to temperature, for example, is not taken into account.

SUMMARY OF THE INVENTION

The problem to be solved by the invention is thus to detect a defective meshing of the engaging clutch and to ensure a reliable gearshift sequence.

According to the invention, the problem is solved by means of a process for controlling and regulating an automatic transmission actuated by a drive unit, preferably an internal combustion engine. On the basis of input variables, an electronic control unit controls, via electromagnetic actuators, clutches and brakes of the automatic transmission. A change over of the automatic transmission from a first to a second reduction ratio is carried out by a sequence controlled disengagement of a first clutch and engagement a second clutch, with no excessive increase of the transmission input speed occurring during this change over. A defective meshing of the second clutch is detected when, during a load take-up phase, the transmission input speed becomes higher than the product of a transmission output speed multiplied by the first reduction ratio or the transmission input speed becomes higher than a first limiting value dn1. Upon detection of a defect, the sequence control is discontinued and a regulating phase is started for the disengaging clutch.

The solution according to the invention offers the advantage of a change from the control process to the regulation process for the first clutch occurring only in particular cases. In comparison with an exclusively regulating process, a substantial reduction of coordination parameters thus results. A further advantage exists in the elimination of the difficulty in the regulating passage of the first clutch from adhering to sliding.

In an embodiment according to the invention, it is proposed that in the regulation phase the pressure level of the first clutch is adjusted so that the transmission input speed does not exceed a second limiting value dn2.

In another embodiment according to the invention, it is proposed that the regulation phase of the clutch terminate when the difference of the transmission input speed minus the product of the transmission output speed multiplied by the first reduction ratio falls below a third positive limiting value dn3. Accordingly, a passage from a first pressure level, at the end of the regulation phase, to a second pressure level is sloped. The second pressure level corresponds to the pressure level calculated from the sequence control.

DESCRIPTION OF THE PREFERRED EMBODIMENT(S)

Figure 1:
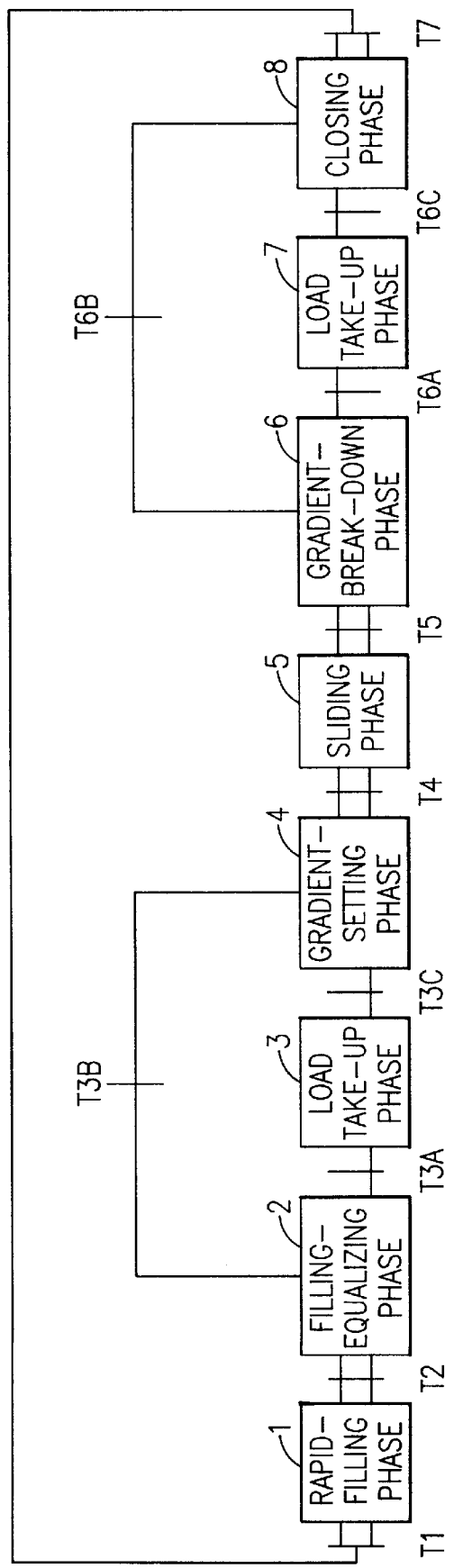
FIG. 1 is a phase diagram.

FIG. 1 shows a phase diagram for the sequence control consisting of: rapid-filling phase 1, filling-equalizing phase 2, load take-up phase 3, gradient-setting phase 4, sliding phase 5, gradient-breakdown phase 6, load take-up phase 7 and closing phase 8. Here the traced line corresponds to the sequence of a gearshift of the first gearshift mode. A gearshift of the first mode is to be understood as an upshift in traction and a downshift in thrust. The dotted line corresponds to a sequence for a gearshift of the second mode. The second gearshift mode is to be understood as a downshift in traction and an upshift in thrust. A sequence according to the phase diagram is carried out for each of the two clutches involved in the gearshift. The passage from one phase to the other depends upon the occurrence of defined events or conditions, hereinafter called transitions.

For a gearshift of the first mode, the following sequence results for the second clutch: in transition T1, an electronic control unit detects, on the basis of input signals, a needed gearshift and issues a gearshift command upon which the rapid-filling phase 1 follows. During the rapid-filling phase 1, the second clutch is loaded with high pressure, the rapid-filling pressure. During the transition T2, a check is made as to whether a time step which controls the duration of the rapid-filling pressure has elapsed. The filling-equalizing phase 2 then follows. In the filling-equalizing phase 2, the second clutch is filled with pressure medium. The second clutch still transmits no torque. At transition T3A, a check is made as to whether a time step which controls the duration of the filling-equalization has elapsed. The load take-up phase 3 then follows. During the load take-up phase 3, the pressure in the second clutch is raised from the filling equalization level to a first final value which is a function of a first parameter. The the first parameter corresponds to a static torque which, in turn, corresponds to a function of the actual torque generated by a drive unit, such as in an internal combustion engine, multiplied by a conversion ratio. When using an automatic transmission without a hydro-dynamic converter, the static torque corresponds to the actual torque generated by the internal combustion engine. Transition T3C is accomplished when the torque in the second clutch corresponds to the static torque. The gradient-setting phase 4 then follows. During the gradient-setting phase 4, the pressure of the second clutch is raised from the first final value to a second final value. The second final value is a function of a second parameter. The a second parameter contains one dynamic torque. At transition T4, a check is made as to whether a time step has elapsed. The sliding phase 5 then follows. At transition T5, a check is made as to whether the pre-synchronization point has been reached. The pre-synchronization point is determined from a differential speed gradient of the second clutch, the actual differential speed value of the second clutch and a time step. The gradient-breakdown phase 6 then follows. During the gradient-brakedown phase 6, the pressure is reduced to a third final value which is a function of a third parameter. The third parameter is established by a time step for the passage from the differential-speed gradient, at the pre-synchronization point, to the differential-speed gradient, at the synchronization point. The differential-speed gradient and the differential speed at the synchronization point of the second clutch are zero. During said phase, the previously built up dynamic torque is again broken down. At transition T6B, a check is made as to whether the pressure from the dynamic torque has broken down or whether the synchronization speed has been reached. The closing phase 8 then follows. During the closing phase 8, the pressure in the second clutch is slopingly raised until the absolute value of the differential speed of the second clutch, within a third time step, is less than a set value. If this condition has been fulfilled, the second clutch is loaded with main pressure. At transition T7, a check is made as to whether an adherence of the second clutch has been detected. The phase diagram starts again at T1.

A gearshift of the second mode consists of a rapid-filling phase 1, a filling-equalizing phase 2, a gradient-setting phase 4, a sliding phase 5, a gradient-breakdown phase 6, a load take-up phase 7 and a closing phase 8. Since the function blocks have already been described, a repeated description is hereby omitted. Transitions T3B, T6A and T6C have been supplementarily added. AT T3B, the first clutch is checked as to whether a time step has elapsed for the filling equalization. At transition T6A, the first clutch is checked as to whether the pressure from the dynamic torque has broken down, and at transition T6C a check is made as to whether a time step has elapsed.

Figure 2A:
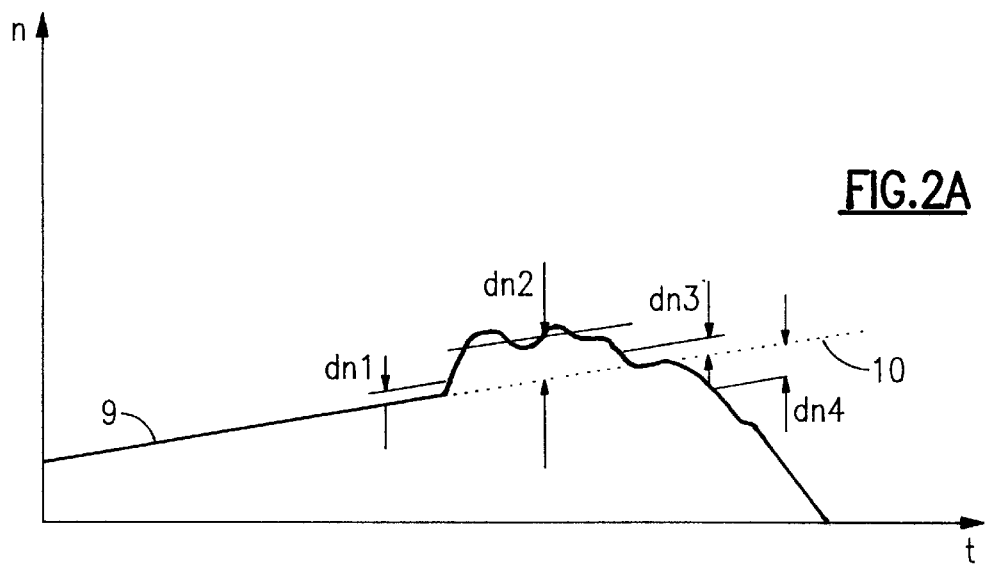
FIG. 2 is a time diagram of an upshift.
Figure 2B:
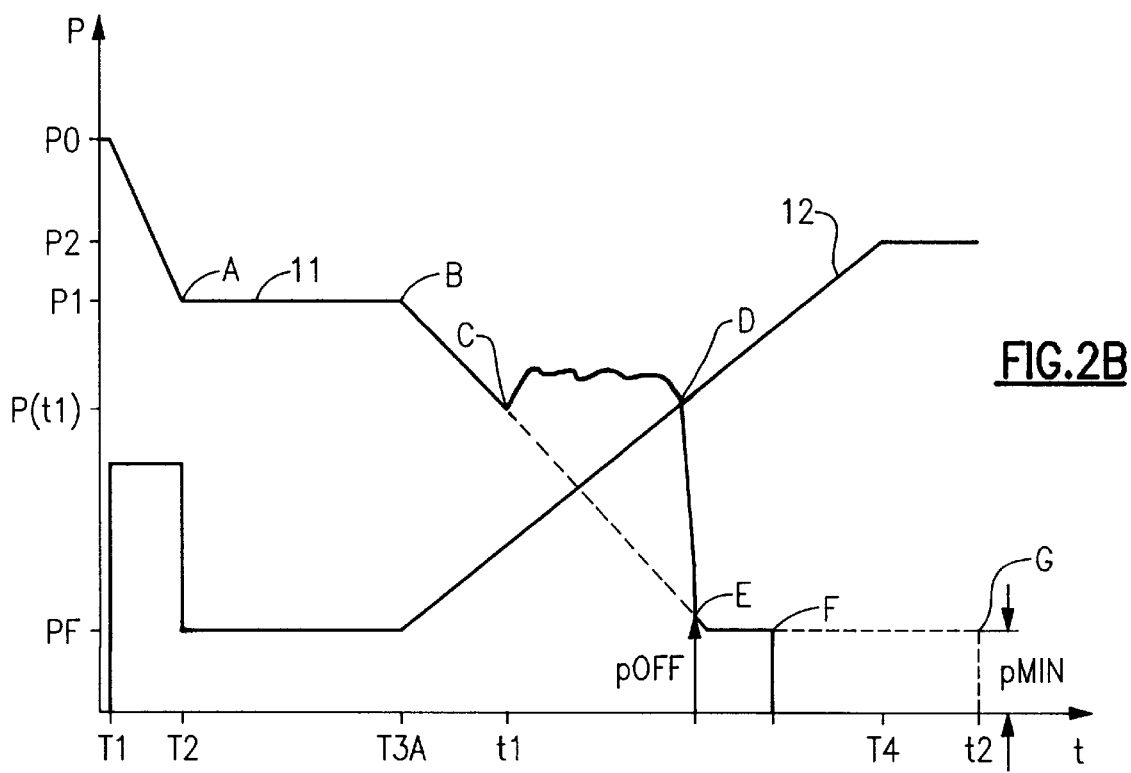

FIG. 2A and 2B show, for a gearshift of the first mode, an upshift for example, the speed curve for a transmission input speed 9 and the pressure curve during this time, for the first clutch 11 and the second clutch 12. The values of T, shown on the abscissa, correspond to the transitions of FIG. 1. At T1, an electronic control unit issues the shift command. The pressure of the first clutch 11 is simultaneously reduced from an initial value p0 to a pressure value of the point A. The pressure level of the point A is above the slipping limit of the first clutch 11. At transition T1, the clutch 12 is likewise loaded with high pressure, which is the rapid-filling pressure. This corresponds to the rapid-filling phase of FIG. 1. At transition T2, the time step for the rapid-filling phase, has elapsed. The filling-equalizing phase starts for the second clutch 12 up to transition T3A. During the filling-equalizing phase, pressure level pF, the second clutch 12 is loaded with pressure medium, still transmitting no torque. During the filling-equalizing phase of the second clutch 12, the pressure level of the first clutch 11 remains constant, which is the pressure level p1. At transition T3A, a check is made as to whether a time step has elapsed for the filling equalization. If the condition has been fulfilled, the load take-up phase begins for the second clutch 12. During the load take-phase, the pressure of the first clutch 11 is reduced from the pressure level p1, point B, via a negative pressure ramp, to the pressure final value, point E. If the actual pressure curve of the second clutch 12 now does not correspond to the controlled pressure, for example, as a result of the temperature of the pressure medium, a defect appears. The defect causes the transmission input speed 9 to become higher than the product of the transmission output speed multiplied by the first reduction ratio or becomes higher than a first limiting value dn1. This product is shown as dotted line 10 in FIG. 2A. At the moment t1, the transmission input speed exceeds the first limiting value dn1. At the t1 moment, the pressure level of the first clutch 11 has reached the pressure value p (t1) of point C. With the appearance of the defect, the sequence control is discontinued and a regulation phase begins for the first clutch 11. The pressure curve during the regulation phase is adjusted so that the transmission input speed 9 does not exceed a second limiting value dn2. This corresponds, in FIG. 2, to the curve path between the points C and D. In the regulation phase, the pressure level of the first clutch 11 is calculated according to the following formula:

$$pK = (p(t1) - pOFF)(M\_MOT/M\_MOT\ (t1)) + p\ \text{rule} + pOFF\ \text{p rule} = f(dn\_T(\text{set}), dn\_T(\text{actual}))$$

The meanings of the variables are as follows: t1 is the moment at which an excessive increase of the transmission input speed appears, p(t1) is the pressure level of the clutch 11 at said moment, M_MOT is the actual torque generated by the drive unit, M_MOT (t1) is the torque generated by the drive unit at moment t1, and dn_T is the difference of the transmission input speed minus the product of the transmission output speed multiplied by the first reduction ratio. The pressure portion pOFF, takes into consideration the piston recoil force.

When a correspondingly high pressure level has built up in the second clutch 12, the latter assumes the load of the first clutch 11. This is shown by the fact that the transmission input speed 9 falls below a third positive limiting value dn3. With the falling below said limiting value, the pressure level of the first clutch 11 is slopingly reduced from the pressure value of the point D to the pressure value of the point E. This slope prevents the first clutch 11 from re-opening. The pressure level of the point E corresponds to the pressure level calculated from the sequence control at this moment. If the first clutch 11 falls below a fourth negative limiting value dn4, then the first clutch 11 becomes completely disengaged, point F. The pressure level of point F, pMIN, corresponds to a minimal clutch pressure.

A time step begins with the termination of the gradient-setting phase of the second clutch 12, pressure level p2. If the time step has elapsed, the first clutch 11 forcibly becomes disengaged. This case is shown in FIG. 2B by the dotted pressure curve between the points F and G. Since the further gearshift sequence is not relevant for an understanding of the invention, it has not been shown. Insofar as other gearshift modes are concerned, with the exception of the upshift described here, reference is expressly had to the figure description of German patent application P 44 24 456.8 of Jul. 12, 1994. The statements appearing there, in relation to other gearshifts, are thus complementary part of the explanations given here.

| Reference numerals | |
|---|---|
| 1 rapid-filling phase | 8 closing phase |
| 2 filling equalizing phase | 9 transmission input speed |
| 3 load take-up phase | 10 transmission output speed multiplied by the first reduction ratio |
| 4 gradient-setting phase | |
| 5 sliding phase | |
| 6 gradient-breakdown phase | 11 first clutch |
| 7 load take-up phase | 12 second clutch |

What is claimed is:

1. A method of controlling and regulating an automatic transmission powered by a drive unit and having an electronic control unit which controls, on the basis of input variables and via electronic actuators, at least one of clutches and brakes of said automatic transmission, and a gearshift of said automatic transmission, from a first reduction ratio to a second reduction ratio, which is carried out by a sequence control including disengagement of a first clutch (11) and engagement of a second clutch (12) so that a load take-up by said second clutch (12) takes place without an excessive increase in a transmission input speed (9) occurring during the gearshift; said method comprising the steps of:

constantly monitoring the transmission input speed, for detecting a defective meshing of said second clutch (12);

detecting a defect of the second clutch (12) when said transmission input speed (9) becomes higher than a limiting value (dn1) which is a product of a transmission output speed multiplied by said first reduction ratio (10), said defect occurring when an actual pressure of the second clutch does not correspond to a controlled pressure issued by the electronic control unit; and discontinuing the sequence control, upon an occurrence of the defect, and beginning a regulating phase for said first clutch (11).

2. A method of controlling and regulating an automatic transmission powered by a drive unit and having an electronic control unit which controls, on the basis of input variables and via electronic actuators, at least one of clutches and brakes of said automatic transmission, and a gearshift of said automatic transmission, from a first reduction ratio to a second reduction ratio, which is carried out by a sequence control including disengagement of a first clutch (11) and engagement of a second clutch (12) so that a load take-up by said second clutch (12) takes place without an excessive increase in a transmission input speed (9) occurring during the gearshift; said method comprising the steps of:

constantly monitoring the transmission input speed for detecting a defective meshing of said second clutch (12);

detecting a defect in said second clutch (12) when said transmission input speed (9) becomes higher than a limiting value (dn1) which is a product of a transmission output speed multiplied by said first reduction ratio (10), said defect occurring when an actual pressure of the second clutch does not correspond to a controlled pressure issued by the electronic control unit;

discontinuing the sequence control, upon an occurrence of the defect, and beginning a regulating phase for said first clutch (11); and adjusting a pressure level of said first clutch (11), during the regulating phase, so that said transmission input speed (9) is prevented from exceeding a second limiting value (dn2).

3. A method according to claim 2, further comprising the step of calculating the pressure level (pk) of said first clutch (11), during the regulating phase, according to the formula:

$$pK=(p(t1)-p\ OFF)(M\_MOT/M\_MOT\ (t1))+p\ rule+pOFF$$

wherein:

p rule=f(dn_T(set), dn_T(actual)), and (t1) is a moment at which an excessive increase in the transmission input speed occurs, p(t1) is the pressure level of said first clutch (11) at said moment, M_MOT is an actual torque generated by said drive unit, M_MOT (t1) is a torque generated by said drive unit at the (t1) moment, dn_T is a difference of the transmission input speed (9) minus a product of the transmission output speed multiplied by the first reduction ratio (10), and pOFF is a pressure portion of a piston recoil force.

4. A method according to claim 2, further comprising the step of terminating the regulating phase of said first clutch (11) when the difference of the transmission input speed (9) minus the product of transmission output speed multiplied by said first reduction ratio (10) falls below a positive limiting value (dn3), thereafter slopingly passing the pressure level of said first clutch from a first pressure level, at the end of the regulating phase, to a second pressure level where the second pressure level corresponds to a pressure level calculated from the sequence control.

5. A method according to claim 2, further comprising the step of completely disengaging said first clutch (11) when the difference of said transmission input speed (9) minus the product of transmission output speed multiplied by said first reduction ratio (10) exceeds a negative limiting value (dn4).

6. A method according to claim 2, further comprising the step of forcibly disengaging said first clutch (11), when a time period has elapsed, and said time period beginning with the termination of a gradient-setting phase of said second clutch (12).

7. A method of controlling and regulating a shifting of an automatic transmission, said method comprising the steps of:

lowering a pressure of an engaged first clutch to a level above where the first clutch will allow slippage;

rapidly filling and equalizing a pressure in a disengaged second clutch, prior to engagement of the second clutch;

substantially continuously monitoring the pressures of both the first clutch and the second clutch and an input speed of the transmission;

gradually decreasing the pressure in the first clutch while concurrently gradually increasing the pressure in the second clutch in order to facilitate disengagement of the first clutch and engagement of the second clutch; and entering a regulating phase for the first clutch if excessive slippage occurs during the shifting, where excessive slippage occurs when an actual pressure in the second clutch varies from a desired pressure such that the input speed of the transmission exceeds a limiting value (dn1) of a product of an output speed of the transmission multiplied by a first reduction ratio, wherein the regulating phase comprises the steps of:

adjusting the pressure of said first clutch so that the transmission input speed is prevented from exceeding a second limiting value (dn2); and once the pressure in the second clutch is sufficient for the second clutch to fully engage without excessive slipping, discontinuing the regulating phase by lowering the pressure in the first clutch to a pressure level where the first clutch is completely disengaged.

* * * * *